United States Patent [19]

Flotow

[11] Patent Number: 4,715,484

[45] Date of Patent: Dec. 29, 1987

[54] AUTOMATIC INTERMEDIATE PLATE POSITIONER

[75] Inventor: Richard A. Flotow, Butler, Ind.

[73] Assignee: Dana Corporation, Toledo, Ohio

[21] Appl. No.: 942,782

[22] Filed: Dec. 17, 1986

[51] Int. Cl.[4] ............................................. F16D 13/75
[52] U.S. Cl. .............................. 192/70.25; 192/111 A
[58] Field of Search ............. 192/70.25, 111 A, 70.26, 192/48.1; 188/71.7

[56] References Cited

U.S. PATENT DOCUMENTS

| | | |
|---|---|---|
| 2,366,594 | 1/1945 | Carlson . |
| 2,385,517 | 9/1945 | Hunt . |
| 3,360,089 | 12/1967 | Cockerill et al. . |
| 3,561,577 | 2/1971 | Binder . |
| 4,257,502 | 3/1981 | Riese . |

Primary Examiner—Rodney H. Bonck
Assistant Examiner—Richard M. Lorence
Attorney, Agent, or Firm—Harold D. Shall

[57] ABSTRACT

A positioning device for positioning the intermediate plate of a multiple plate friction clutch as wear occurs. The device includes a base plate and facing assembly disposed adjacent the outer surface of each intermediate plate drive lug. The assembly includes a layer of friction material which frictionally engages the outer surface of the lug. A lock plate is disposed outwardly of each assembly. Each lock plate and assembly is secured to the lug by a spring loading bolt passing through apertures therein. The friction force is adjusted with the bolt. The lock plate includes a first pair of tabs which engage the head of the bolt to prevent rotation and a second pair of tabs to fit in a slot in the clutch cover and prevent rotation of the lock plate. The positioning device abuts the flywheel and the clutch cover alternately during use and is moved relative to the lug as the friction surfaces wear.

6 Claims, 9 Drawing Figures

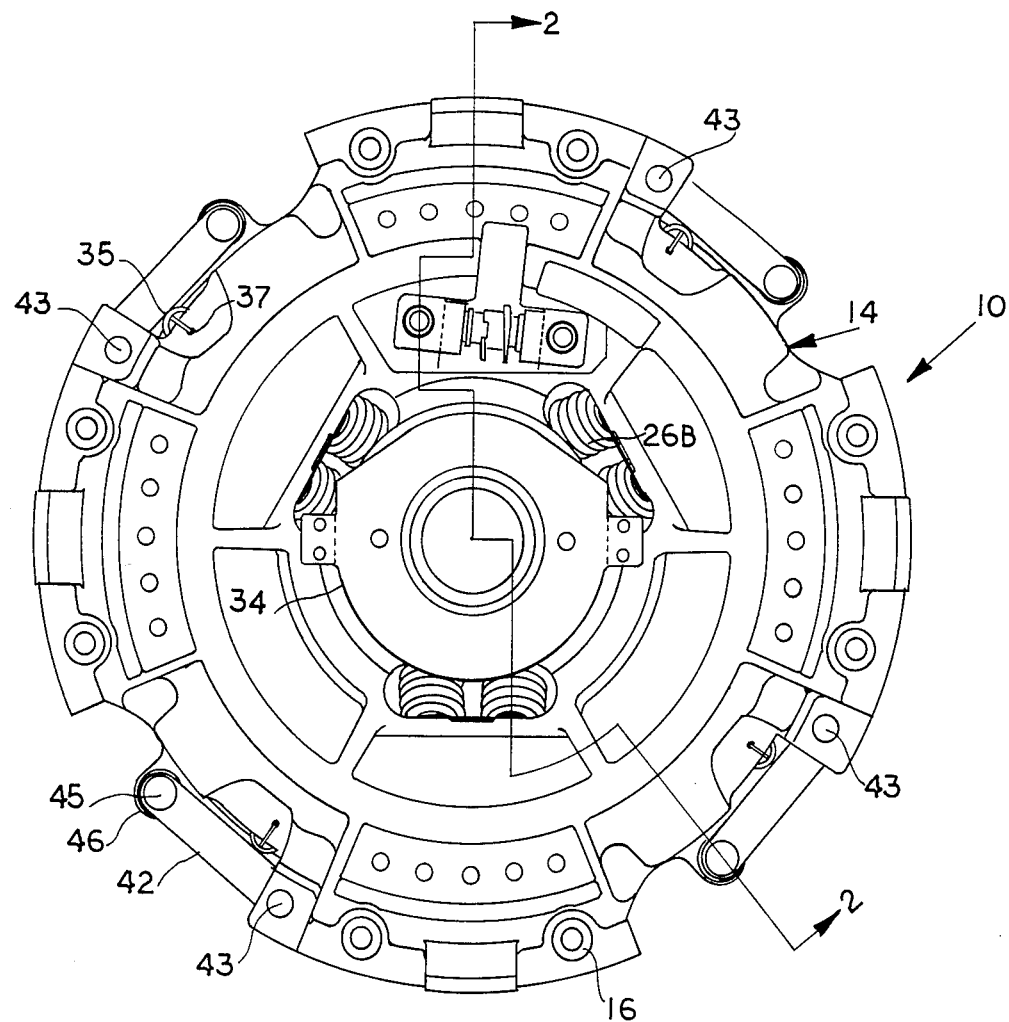
FIG_1

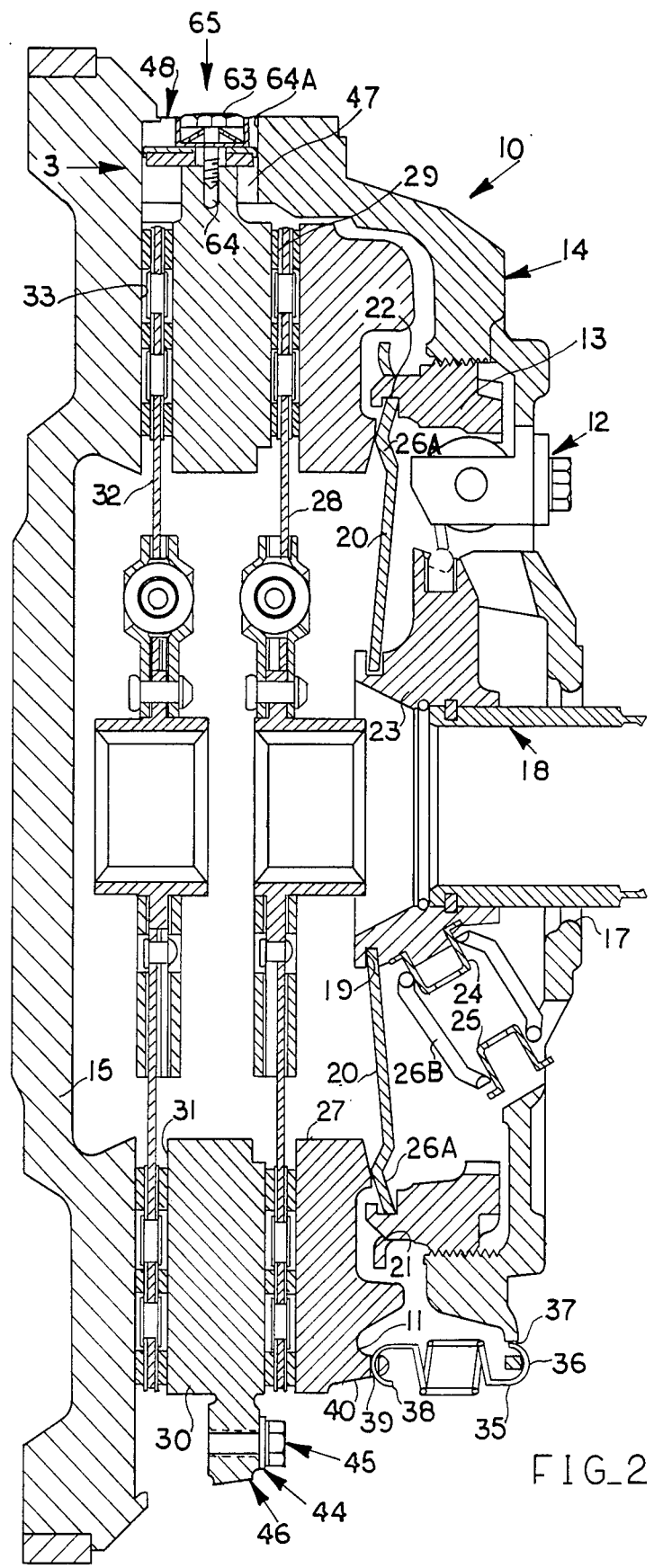
FIG_2

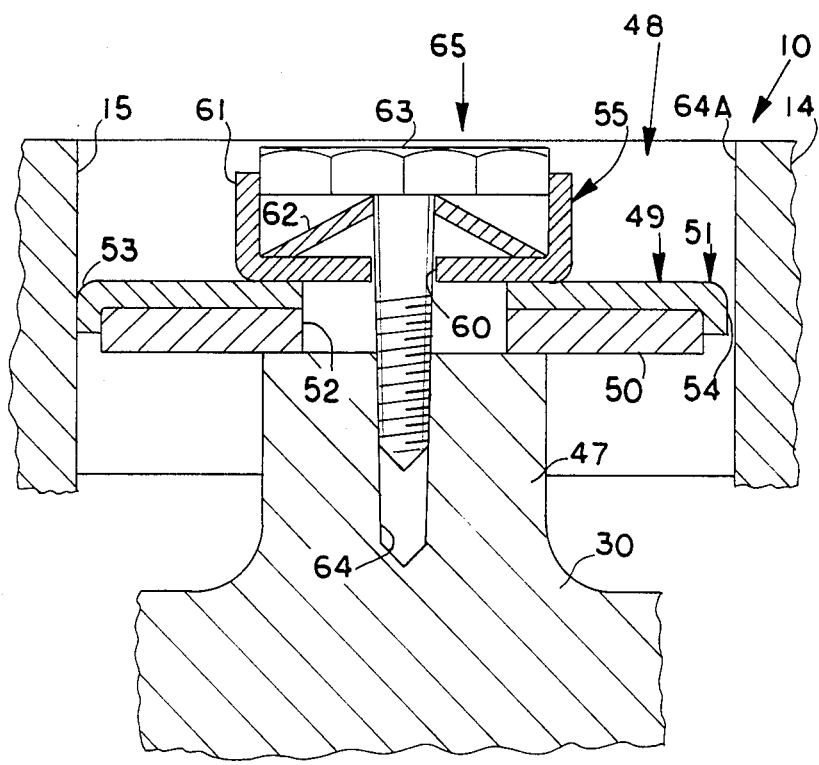
FIG_3A

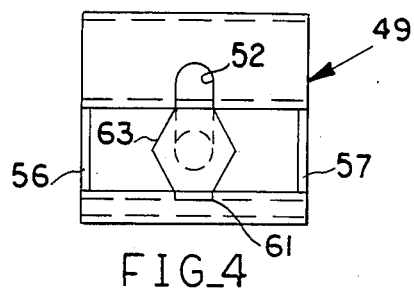
FIG_4
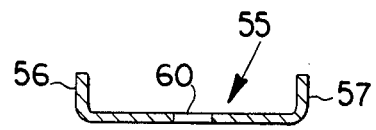
FIG_6
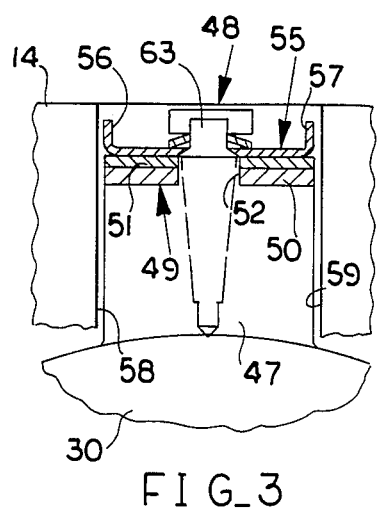
FIG_3
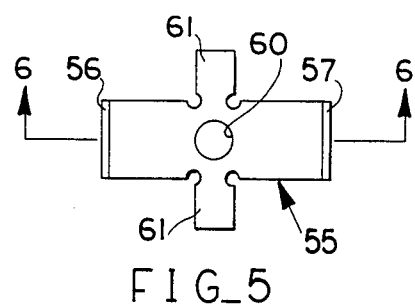
FIG_5

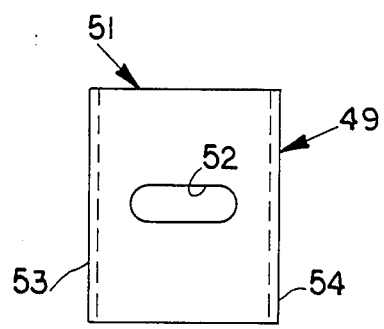
FIG_8
FIG_7

4,715,484

AUTOMATIC INTERMEDIATE PLATE POSITIONER

FIELD OF THE INVENTION

The present invention relates to an improved structure for providing a positive release of the intermediate plate of a two plate friction clutch by providing for improved positioning of the intermediate plate between the front and rear discs of the two plate clutch, especially as wear occurs on the various clutch members.

DESCRIPTION OF THE PRIOR ART

U.S. Pat. No. 3,561,577 discloses a multiple disc clutch with an automatic wear adjustor in the form of an abutment member on the intermediate plate which engages abutments formed on the flywheel and the clutch cover; however, this device does not disclose a lock plate having anti rotational tabs nor does the lock plate have means thereon to prevent inadvertent rotation of the lock screw.

Other patents have been directed to providing for adjustment of the relative position of the clutch members, however, none of them are directed to applicants invention as claimed.

SUMMARY OF THE INVENTION

The present invention relates to an improved means for positioning the intermediate plate of a multiple-disc friction clutch in the disengaged position, especially as wear occurs on the friction facings therein. The positioning means includes a base plate and facing assembly disposed adjacent to the outer circumferential surface of each of the intermediate plate drive lugs. Each assembly includes a layer of friction material which is adapted to frictionally engage the smooth outer surface of the drive lug.

A lock plate is disposed outwardly of each assembly. Each lock plate and assembly is secured to the drive lug by means of a bolt extending through respective apertures formed therein. A spring washer is disposed between the head of the bolt and the lock plate to preload a predetermined frictional force between the friction material of the base plate and friction assembly and the drive lug. The lock plate includes a first pair of tabs, which are adapted to be bent radially outwardly to engage the sides of the head of the bolt to prevent rotation thereof during use and a second pair of tabs, which are adapted to be bent radially outwardly and fit within the conventional drive slot formed in the cover of the clutch, also to prevent rotation.

The frictional force between the friction material and the drive lug is predetermined to be less than the force exerted by the main engagement springs of the clutch, but more than the force exerted by the return springs of the intermediate disc of the clutch to cause disengagement thereof. The main springs overcome the frictional material to position the positioning means relative to the flywheel and intermediate disc, while the return springs, in returning the latter disc to its disengaged position, is not strong enough to overcome the friction material of the positioning means and the positioning means, in abutting the clutch cover assembly during disengagement, positions the intermediate plate relative to the driven discs.

The invention accordingly comprises the features of construction, combination of elements and arrangement of parts that will be exemplified in the construction hereafter set forth, and the scope of the invention will be indicated in the claims.

BRIEF DESCRIPTION OF THE DRAWINGS

FIG. 1 is a rear elevational view of a clutch assembly accordingly to this invention, with the flywheel omitted for clarity;

FIG. 2 is a sectional view taken along the lines 2—2 in FIG. 1 with the flywheel shown in place, and the throw-out bearing being omitted for clarity;

FIG. 3 is an enlarged view of a lug of the intermediate plate with the positioning means shown thereon when viewed in the direction of the arrow 3 in FIG. 2; there being a fragmentary showing of the drive slots in the cover;

FIG. 3A is an enlarged view of outer end of the lug of the intermediate plate with the positioning means as seen in FIG. 2;

FIG. 4 is a plan view of the view seen in FIG. 3;

FIG. 5 is a plan view of the lock plate used in FIGS. 3, 3A and 4 with the bolt holding tangs in their unbent position;

FIG. 6 is a view of the lock plate of FIG. 5 when viewed along the lines 6—6 in FIG. 5;

FIG. 7 is a side elevational view of the base plate and friction assembly; and

FIG. 8 is a plan view of the device seen in FIG. 7.

DETAILED DESCRIPTION OF A PREFERRED EMBODIMENT

Referring now to the drawings and more particularly to FIGS. 1 and 2, a two plate clutch for a motor vehicle is shown generally at 10 and is of the well known type of pull-type-to-release clutch having an automatic wear adjuster take-up mechanism 12, which mechanism, upon engagement of the clutch acts upon an adjusting ring 13 which is threaded into a cover assembly 14 of the clutch 10.

The cover assembly 14 covers the internal clutch components and is secured for unitary rotation to a flywheel 15 which is conventionally secured to the cover assembly for unitary rotation by a plurality of bolts (not shown) which pass through a plurality of spaced openings 16 in the cover and are conventionally secured in registering openings (not shown) in the flywheel 15. The cover assembly 14 has a central axially extending opening 17, through which passes a clutch collar assembly 18, to the right end of which is attached the conventional throw-out bearing (not shown in FIG. 2). The left end of the clutch collar assembly 18 has an annular groove 19 therein which receives the radially inner ends of a plurality of circumferentially spaced clutch levers 20.

Adjacent the outer ends of the levers 20, each lever has an opening 21 therein, which opening is each pivotally received and retained on a pivot finger 22. The clutch collar assembly 18 includes a collecting ring 23 in which the groove 19 is formed, and a plurality of clutch engaging coiled compression springs 26B are conventionally disposed between buttons 24 on the collector ring 23 and buttons 25 carried by the cover assembly 14, to urge the collection ring 23 and the radially inner ends of the clutch levers to the left.

Between the pivot fingers and the inner ends of the lever (and much closer to the pivot fingers) the left side of the levers 20 are formed with a leftwardly extending projection 26A, which projections abut against the right face of an annular pressure plate 27 which is compressed against the friction surface on the right face of a conventional right driven disc 28. The left friction surface of the right driven disc 28 is compressed against the right friction face 29 of an intermediate plate 30. The left friction face 31 of the intermediate plate 30 conventionally is compressed against the right friction surface of the left driven disc 32 while the left friction surface of the driven disc 32 is compressed in a conventional manner against the friction face 33 of the flywheel 15.

The six compression springs 26B urge the collecting ring 23 the left, which, in turn, urges the radially inner ends of the levers 20 to the left; the latter in turn urge the pressure plate 27 to the left which compresses the driven discs 28 and 32 and the intermediate plate 30 to the left all into frictional engagement with the disc 32 engaging the flywheel 15 so that the clutch 10 is engaged to be driven by the flywheel.

Movement of the clutch collar assembly 18 to the right by the throw-out bearing 34, seen in FIG. 1, compresses the springs 26B and moves the colecting ring 23 along with the inner ends of the levers 20 to the right, which releases the clutch 10 in a well known manner. A plurality of coiled tension springs 35 are circumferentially spaced about the clutch cover 14 with their outer or right ends (as seen in FIG. 2) received in openings 37 in the clutch cover and their inner or left ends 38 received in openings 39 formed in a rib 40 on the right face of the pressure plate 27. Upon clutch disengagement as described above, the springs 35 move the pressure plate 27 to the right and releases its engagement load upon the driven discs 28 and 32 and the intermediate plate 30. Actuation of the collecting ring, through the operation of the automatic wear adjuster take up mechanism 12, causes the adjusting ring 13 to be threaded to the left in the cover 14 to reposition the pressure plate 27 to the left to take up for wear of the various friction components.

The intermediate plate 30 also has return springs and these take the form of spring straps 42; there being four of such straps as seen in FIG. 1, their counterclockwise ends 43 conventionally bolted to the cover by bolts (not shown) and their clockwise ends 44 each bolted by bolt 45 to one of 4 spaced lugs 46 (lugs 46 being spaced at 90 degree intervals). The spring straps 42 act as return springs in a conventional manner.

The intermediate plate 30 also has 4 drive lugs, one of which is shown at 47 in FIGS. 2, 3 and 3A; the four drive lugs 47 being spaced at 90 degrees to the adjacent lug and with a lug being disposed intermediate a pair of lugs 46. Each lug 47 is received in a conventional drive slot 48 formed in the cover 14.

Mounted on the flat outer end of each drive lug 47 and disposed within the drive slot 48 is a positioning means as clearly shown in FIGS. 2, 3 and 3A. Positioned directly against the radially outer flat end of each drive lug is a base plate and facing assembly 49. The base plate and facing assembly 49 includes a friction facing 50 securely bonded to the radially inner surface of a base plate 51. Centrally formed in the assembly 49 is an axially elongated slot 52 which is elongated in the fore and aft direction of the clutch 10 and the lug 47 carrying the same. The fore and aft edges of the base plate 53 and 54 respectively, are bent radially inwardly and overlie the fore and aft ends of the friction facing 50. As seen in FIG. 3, in the transverse direction of the clutch 10 and lug 47, the plate and facing assembly 49 are coextensive with the circumferential width of the lug 47, while as seen in FIGS. 2 and 3A, the assembly 49 is longer in the axial direction of the clutch 10 than the lug 47 on which it is mounted.

Disposed on top of the assembly 49 is a lock plate 55 which is elongated in a direction transverse to the axis of the clutch 10 and lug 47. The elongated ends terminate, as seen in FIGS. 3 and 4, in left and right radially outward bent lips 56 and 57 respectively, which lips 56 and 57 respectively, which lips are coextensive with the circumferential, (that is, transverse) width of the lug 47 and coextensive with the plate and facing assembly 49.

The transverse edges of the lug 47, of the assembly 49 and of the lips 56 and 57 of the lock plate 55, as seen in FIG. 3, all abut in a driving relationship the transversely spaced left and right faces 58 and 59 of the drive slot 48 which receives the same, while being axially movable therein to accomodate axial conventional movement of the intermediate plate 30 relative to the cover 14.

The lock plate 55, as seen in FIGS. 3A, 5 and 6, has a centrally disposed bolt hole 60, which hold overlies the slot 52 in the assembly 49 and also has a pair of shorter tangs 61 disposed 90 degrees from the tangs 56 and 57.

Disposed on top of the lock plate 55 is a belleville spring washer 62 and a bolt 63 passes through the hole in the washer 62, the hole 60 in the lockplate and through the slot 52 in the friction assembly 49 and is threaded into a hole 64 formed centrally in the lug 47. The amount of friction between the friction facing 50 of the plate and facing assembly 49 and the outer flat surface of the lug 47 is controlled by the degree to which the bolt 63 is tightened. Once the bolt is so tightened, the tangs 61 of the lock plate 55 are bent upwardly from the flat position seen in FIG. 5 to the upright position seen in FIG. 3A to thereby abut the sides of the bolt 63 and prevent turning thereof. Additionally, the lips 56 and 57 of the lock plate 55 abut the faces 58 and 59 of the drive slot 48 to prevent rotation of the lock plate. Thus the bolt 63, once adjusted, remains so; however, the tangs 61 can be bent flat to allow readjustment of the bolt 60 to readjust the friction between the assembly 49 and the end of the lug 47; it being noted that all four lugs are likewise adjusted with the loads being substantially equal.

With the clutch 10 in the engaged position as seen in FIG. 1 the forward edge 53 of the assembly 49 is in engagement with the adjacent surface of the flywheel 15, while the aft edge 54 of the assembly 49 is slightly spaced from the back face 64A of the drive slot 48. It has been found that a space of about 0.025 to 0.030 inches is satisfactory. Upon clutch disengagement, the spring straps 42 will move the intermediate plate to the right so that the aft edge 54 engages the back face 64A of the drive slot 48. However the force of the four spring straps 42 is less than the adjusted friction between the friction facings 50 and the drive lugs 47 so that no relative movement occurs between the devices 65 and the ends of the lugs and the intermediate plate is positioned by the positioning device 65.

If any wear occurs on the various friction surfaces of the driven discs 28 and 32, for example, when the clutch is moved to the engaged position by the six coiled compression springs 26B and the forward edge 53 of the positioning device abuts the flywheel 15, the much greater load of the compression springs 26B than the friction load between the positioning devices 65 and the drive lugs 47 will force the lugs to move to the left relative to the positioning devices, the slots 52 sliding along the bolt 63 in the axial direction, so that upon clutch disengagement a space of about 0.025 to 0.030 inches will be maintained between the aft edge 54 of the positioning device and the back face 64A of the drive slot 48, to thereby position the intermediate plate 30 between the driven discs.

Having thus described the invention, it is seen that the objects set forth are efficiently attained and since certain changes can be made without departing from the scope of the invention, it is intended that all matters contained in the description or shown in the drawings shall be interpreted as illustrative and not in a limiting sense.

Now that the invention has been described,
What is claimed is:

1. A friction clutch having an axis of rotation and including in combination, a clutch cover assembly secured to a flywheel, said clutch cover surrounding a pair of axially spaced pressure members with the pressure member farthest from the flywheel being a pressure plate and the pressure member closest to the flywheel being an intermediate plate, a pair of driven discs with one disc being disposed between said pair of pressure members and the other disc disposed between the intermediate plate and said flywheel, clutch engaging spring means acting between said cover means and said pressure plate for biasing said pressure plate toward said flywheel and engaging said pressure members and said driven discs and said flywheel in driving relationship, a throwout bearing for withdrawing said clutch engaging spring load, a first spring return means for returning said pressure plate to its disengaged position with said first spring return means imposing a much lower load than said clutch engaging spring means, second spring return means for returning said intermediate plate to its disengaged position in a spaced relationship to said other driven disc and further removed from said flywheel than its position relative to said flywheel when in its engaged position, said second spring return means imposing a much lower load than said clutch engaging spring means on said intermediate plate, a plurality of drive lugs on said intermediate plate extending radially outwardly therefrom and having a bolt hole in the periphery thereof, a plurality of drive slots in said clutch cover with each receiving a drive lug in a driving relationship for imposing rotational loads thereon about said clutch axis, each of said slots being open in the direction facing said flywheel and each slot having a rear face opposed to and facing said flywheel and each slot having a pair of circumferentially opposed driving faces, a positioning means mounted on the radially outer surface of each of said drive lugs, said positioning means including a friction member which is longer in the axial direction than the lug mounting the same while being of the same circumferential size, said friction member having an axially elongated slot therein, the forward end of said friction member engaging said flywheel upon clutch engagement to position said friction means on said drive lug and being engageable with said rear face of said drive slot upon clutch disengagement for positioning said intermediate plate, said positioning means also including a lock strap which has a central hole therein overlying the slot in said friction member and has a pair of circumferentially extending ends engageable with said driving faces of said drive slots, said lock strap having a pair of bendable axially extending tangs thereon, a positioning means spring disposed on said lock strap with an aperture therein aligned with the hole in the lock strap, and a bolt passing through said positioning means spring, said lock strap and said friction means and threaded into the bolt hole in the periphery of each of said drive lugs, said bolt being adjustable to adjust friction between said positioning means friction member and the drive lug carrying the same, said axially extending tangs on each of said lock straps being bendable radially outwardly to engage and prevent rotation of the bolt received in said positioning means, said bolts of all said positioning means adjusting the friction between said friction members and said lugs so that the total load on said lugs is greater than said second spring return means but less than the load on said pressure members imposed by said clutch engaging spring means.

2. A clutch according to claim 1 wherein said positioning means spring is a Belleville washer with a central hole receiving said bolt.

3. A clutch according to claim 1 wherein said friction member includes a base plate and friction means secured to the inner surface thereof with said base plate axially overlying said friction means in both the fore and aft direction.

4. A friction clutch having an axis of rotation and including in combination, a clutch cover secured to a flywheel, said clutch cover surrounding a pair of axially spaced pressure members with the pressure member farthest from the flywheel being a pressure plate and the pressure member closest to the flywheel being an intermediate plate, a pair of driven discs with one disc being disposed between said pair of pressure members and the other disc disposed between the intermediate plate and said flywheel, clutch engaging spring means acting between said cover means and said pressure plate for biasing said pressure plate toward said flywheel and engaging said pressure members and said driven discs and said flywheel in driving relationship, a throwout bearing for withdrawing said clutch engaging spring load, a first spring return means for returning said pressure plate to its disengaged position with said first spring return means imposing a much lower load then said clutch engaging spring means, second return means including at least said intermediate plate for returning said intermediate plate to its disengaged position further removed from said flywheel than its position relative to said flywheel when in its engaged position, said second return means imposing a much lower load than said clutch engaging spring means on said intermediate plate, a plurality of drive lugs on said intermediate plate extending radially outwardly therefrom and having a bolt hole in the periphery thereof, a plurality of drive slots in said clutch cover with each receiving a drive lug in a driving relationship for imposing rotational loads thereon about said clutch axis, each of said slots being open in the direction facing said flywheel and each slot having a rear face opposed to and facing said flywheel and each slot having a pair of circumferentially opposed driving faces, a positioning means mounted on the radially outer surface of each of said drive lugs, said positioning means including a friction member which is longer in the axial direction than the lug mounting the same while being of the same circumferential size, said friction member having an axially elongated slot therein, the forward end of said friction member engaging said flywheel upon clutch engagement to position said friction means on said drive lug and being engageable with said rear face of said drive slot upon clutch disengagement for positioning said intermediate plate, said positioning means also including a lock strap which has a central hole therein overlying the slot in said friction member and has a pair of circumferentially extending ends engageable with said driving faces of said drive slots, said lock strap having a pair of bendable axially extending tangs thereon, a positioning means spring disposed on said lock strap with an aperture therein aligned with the hole in the lock strap, and a bolt passing through said positioning means spring, said lock strap and said friction means and threaded into the bolt hole in the periphery of each of said drive lugs, said bolt being adjustable to adjust the friction between said positioning means friction member and the drive lug carrying the same, said axially extending tangs on each of said lock straps being bendable radially outwardly to engage and prevent rotation of the bolt received in said positioning means, said bolts of all said positioning means adjusting the friction between said friction members and said lugs so that the total load on said lugs is greater than said second return means but less than the load on said pressure members imposed by said clutch engaging spring means.

5. A clutch according to claim 4 wherein said positioning means spring is a Belleville washer with a central hole receiving said bolt.

6. A clutch according to claim 4 wherein said friction member includes a base plate and friction means secured to the inner surface thereof with said base plate axially overlying said friction means in both the fore and aft direction.

* * * * *